US008698818B2

(12) United States Patent
Pelton et al.

(10) Patent No.: US 8,698,818 B2
(45) Date of Patent: Apr. 15, 2014

(54) SOFTWARE RASTERIZATION OPTIMIZATION

(75) Inventors: Blake Pelton, Redmond, WA (US); Andy Glaister, Redmond, WA (US); Mikhail Lyapunov, Woodinville, WA (US); Steve Kihslinger, Monroe, WA (US); David Tuft, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 12/121,402

(22) Filed: May 15, 2008

(65) Prior Publication Data

US 2009/0284535 A1    Nov. 19, 2009

(51) Int. Cl.
| G06F 15/80 | (2006.01) |
| G06F 15/16 | (2006.01) |
| G06T 1/20 | (2006.01) |
| G09G 5/00 | (2006.01) |
| G06F 9/26 | (2006.01) |
| G06F 9/45 | (2006.01) |
| G06F 9/46 | (2006.01) |

(52) U.S. Cl.
USPC ........... 345/505; 345/506; 345/606; 345/502; 711/203; 717/119; 717/136; 717/140; 717/151; 718/106

(58) Field of Classification Search
None
See application file for complete search history.

(56) References Cited

U.S. PATENT DOCUMENTS

| 6,417,848 | B1 | 7/2002 | Battle |
| 6,532,016 | B1 | 3/2003 | Venkateswar |
| 6,954,211 | B2 | 10/2005 | Michail |
| 7,061,495 | B1 | 6/2006 | Leather |
| 7,088,368 | B1 | 8/2006 | Andrews |
| 7,190,366 | B2 | 3/2007 | Hutchins |
| 7,324,113 | B1 * | 1/2008 | Rouet et al. ................ 345/522 |
| 7,746,347 | B1 * | 6/2010 | Brown et al. ............... 345/522 |
| 2005/0166195 | A1 * | 7/2005 | Kawahito .................... 717/154 |
| 2006/0269116 | A1 | 11/2006 | Makarovic |
| 2007/0002071 | A1 * | 1/2007 | Hoppe et al. ............... 345/582 |
| 2007/0035545 | A1 | 2/2007 | Hempel |
| 2007/0044069 | A1 * | 2/2007 | Doucette et al. ........... 717/106 |
| 2007/0220525 | A1 | 9/2007 | State |
| 2007/0296725 | A1 | 12/2007 | Steiner |

OTHER PUBLICATIONS

Yang, Bailin, et al. "An Optimized Soft 3D Mobile Graphics Library Based on JIT Backend Compiler"; http://www.springerlink.com/content/7wydv4jv7f45y1r3/, 2005.

Diepstraten, Joachim, et al. "Vragments—Relocatability as an Extension to Programmable Rasterization Hardware"; http://wscg.zcu.cz/wscg2004/Papers_2004_Short/D47.pdf.

Eldridge, Matthew, "Designing Graphics Architectures around Scalability and Communication"; Copyright Jun. 2001, http://graphics.stanford.edu/papers/eldridge_thesis/eldridge_phd_2up.pdf.

* cited by examiner

Primary Examiner — Tize Ma
(74) Attorney, Agent, or Firm — Peter Taylor; Aaron Chatterjee; Micky Minhas

(57) ABSTRACT

Systems, methods, and computer-readable media for optimizing emulated fixed-function and programmable graphics operations are provided. Data comprising fixed function and programmable states for an image or scenario to be rendered is received. The data for the image is translated into operations. One or more optimizations are applied to the operations. The optimized operations are implemented to render the scenario.

20 Claims, 5 Drawing Sheets

SOFTWARE RASTERIZATION OPTIMIZATION

BACKGROUND

Central processing units (CPU) are designed for general purpose computing and do not contain specialized graphics hardware for performing fixed-function graphics operations like texture sampling, rasterization and output blending. CPU hardware, unlike graphics hardware, was not designed for hiding memory latency with large numbers of threads.

BRIEF SUMMARY

Embodiments of the present invention relate to systems, methods, and computer-readable media for optimizing emulated fixed-function and programmable graphics operations. In order to utilize a CPU to implement graphics, software rasterization utilizing the CPU may be used to emulate graphics hardware. Data comprising fixed function state and programmable state for an image or scenario to be rendered is received. The data for the image is translated into one or more representations. One or more optimizations are applied to the representations. The optimized representations are implemented to render the scenario.

This Summary is provided to introduce a selection of concepts that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, computer-implemented methods, and computer-readable media for optimizing emulated fixed-function and programmable graphics. Data comprising fixed function and programmable states for one or more images to be rendered is received. The data for the one or more images is translated into one or more representations. One or more optimizations are applied to the representations. The optimized representations are implemented to render the one or more images.

In another aspect, a computerized system for optimizing emulated fixed-function and programmable graphics is provided. The system comprises receiving component configured for receiving data comprising fixed function and programmable states for one or more images to be rendered and a translation component configured for translating the data into one or more representations. The system further comprises an optimization component configured for applying one or more optimizations to the one or more representations and an execution component configured for executing the one or more optimized representations to render the one or more images.

In yet another aspect, one or more computer readable media having computer-executable instructions embodied thereon that, when executed perform a method that optimizes emulated fixed-function and programmable graphics. Data for one or more images to be rendered is received. The data for the one or more images to be rendered is translated into data parallel programs represented by high-level commands for fixed-function and programmable state of a graphics pipeline. One or more optimizations are applied to the high-level commands. The optimized high-level commands are implemented to render the one or more images. The one or more images are displayed.

Figure 1:
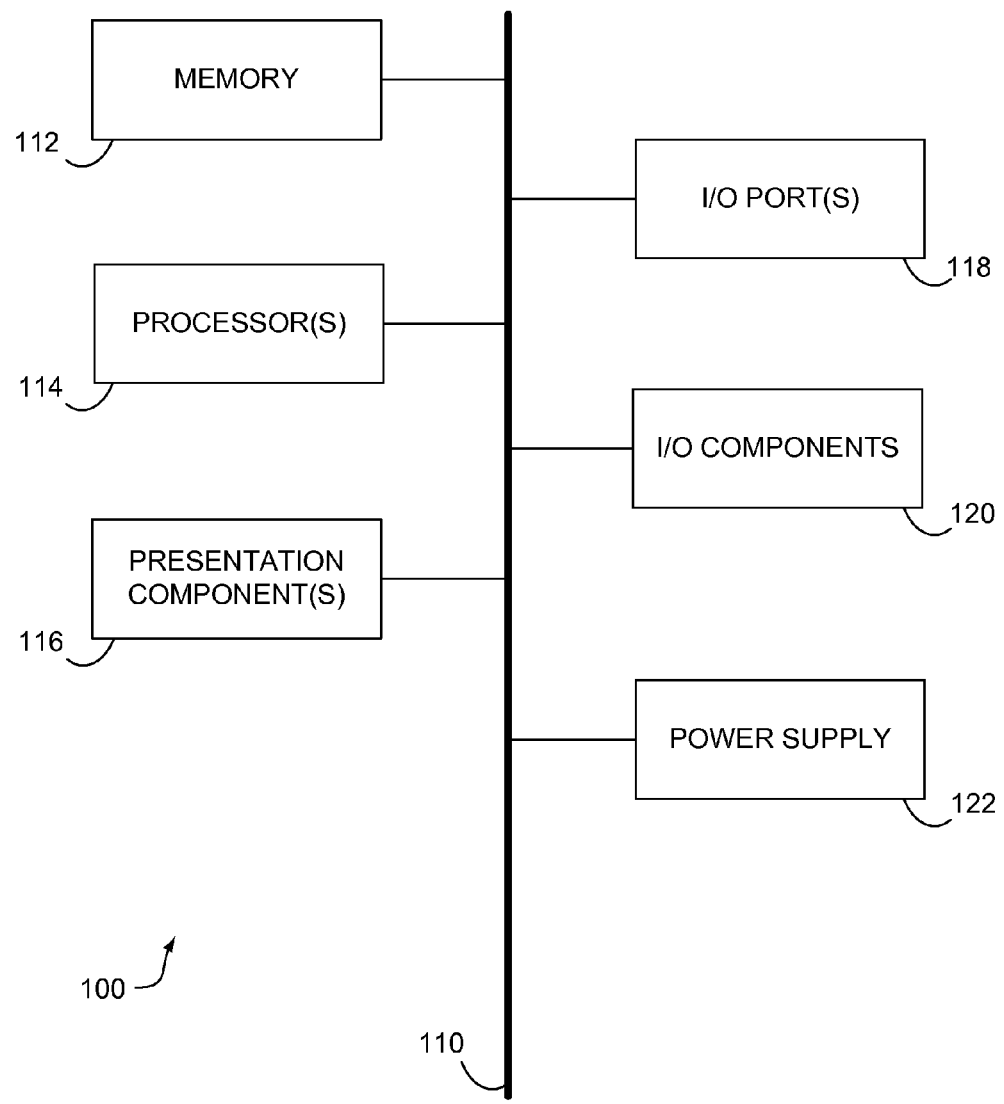
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Figure 2:
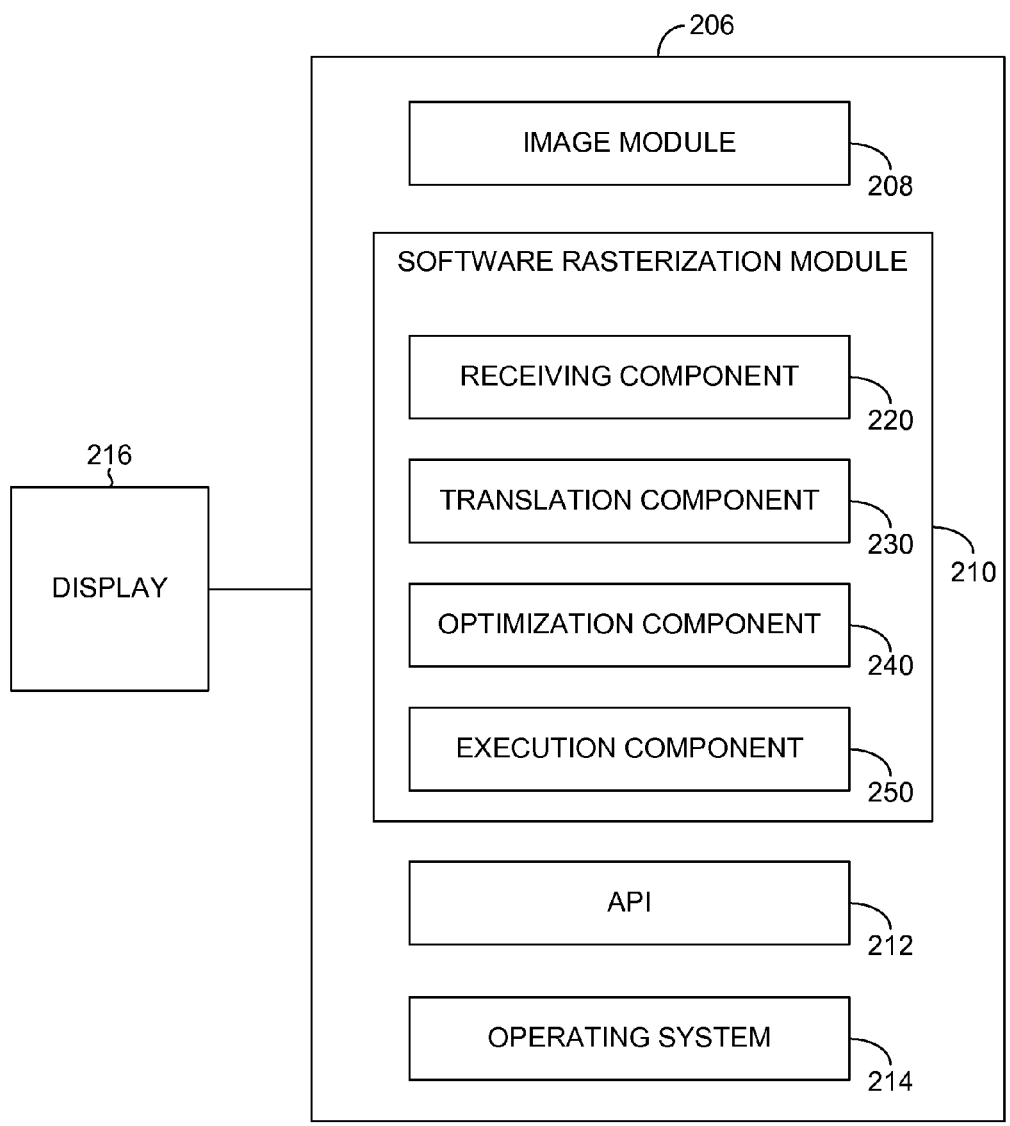
FIG. 2 is a block diagram of an exemplary computing system architecture suitable for use in implementing embodiments of the present invention.

As previously set forth, embodiments of the present invention relate to computing systems for optimizing software rasterization. With reference to FIG. 2, a block diagram is illustrated that shows an exemplary computing system architecture 200 configured for optimizing software rasterization, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components.

Computing system includes computing device 206 and display 216. Computing device 206 comprises an image module 208, a rasterization module 210, API module 212 and operating system 214. Computing device 206 may be any type of computing device, such as, for example, computing device 100 described above with reference to FIG. 1. By way of example only and not limitation, computing device 206 may be a personal computer, desktop computer, laptop computer, handheld device, mobile handset, consumer electronic device, or the like. It should be noted, however, that embodiments are not limited to implementation on such computing devices, but may be implemented on any a variety of different types of computing devices within the scope of embodiments thereof.

Image module 208 transmits data for an image or scenario to be rendered. Image module 208 may be a computer gaming program or other program for which images or scenarios are to be rendered. The images or scenarios to be rendered may include, but are not limited to, video game images, video clips, movie images, and static screen images. Application programming interface (API) module 212 is an interface that operating system 214 provides to support requests made by computer programs, such as image module 208 and software rasterization module 210. Device 206 is in communication with display device 216.

Software rasterization module 210 emulates hardware that implements a rasterization pipeline described in more detail below. Software rasterization module utilizes software rasterization to emulate graphics hardware. Software rasterization uses a central processing unit (CPU) to rasterize polygons instead of having a Graphics Processing Unit (GPU) on a graphics card perform the function. As shown in FIG. 2, the software rasterization module 210 includes a receiving component 220, translation component 230, optimization component 240 and execution component 250. In some embodiments, one or more of the illustrated components may be implemented as stand-alone applications. In other embodiments, one or more of the illustrated modules may be integrated directly into the operating system of the server and/or end user device 206. It will be understood by one of ordinary skill in the art that the components and modules illustrated in FIG. 2 are exemplary in nature and in number and should not be construed as limiting. Any number of components may be employed to achieve the desired functionality within the scope of embodiments hereof. Further, modules may be located on any number of servers or computers.

The receiving component 210 is configured to receive data for an image or scenario to be rendered from image module 208. The images or scenarios to be rendered may include, but are not limited to, video game images, video clips, movie images, and static screen images.

Translation component 230 is configured for emulating graphics hardware and translating the rendering scenario or image received. The data received for the image or scenario to be rendered comprises fixed function and programmable graphics states that is translated into data parallel programs. The data parallel programs represent the graphics operations that occur and combine fixed-function and programmable graphics states. In one embodiment, the fixed-function and programmable state of a graphics pipeline are translated into four (4) data parallel programs represented in high-level commands, such as Intermediate Representation (IR). The four data parallel programs are a vertex program, a geometry program, tessellation program and a pixel program implementing the vertex processing, geometry processing and pixel processing of a graphics pipeline for a rendering scenario. The tessellation program executes the tessellation stage of the graphics pipeline. The IR may express a number of representations or operations. By combining fixed-function and programmable graphics pipeline states into data parallel programs, a common code base can be used to generate efficient implementations of both fixed-function and programmable graphics operations on a central processing unit (CPU), rather than a graphics processing unit (GPU) of a graphics card. While discussed as utilizing data parallel programs represented by IR, it will be appreciated that the translation of fixed function and programmable functions into operations or commands that need to be completed may be accomplished in any variety of ways.

Once the rendering scenario has been translated into operations to be performed by the translation component 230, the optimization component 240 of FIG. 2 performs optimizations on the operations (in one embodiment, the IR) across the fixed-function and programmable stages. Optimization component performs several optimizations. These optimizations may be performed similar to a compiler, such as a C++ compiler. Each data parallel program translated by the translation component 230 combines fixed function and programmable pipeline state, thus, the optimizations are applied to both fixed function and programmable graphics operations emulated by software rasterization. The optimizations applied allow the software rasterization module to render the rendering scenarios more efficiently at runtime. Furthermore, because the optimizations are completed at the IR level, they can benefit all machines, such as CPUs, regardless of how the machine implements the high level IR.

Figure 3:
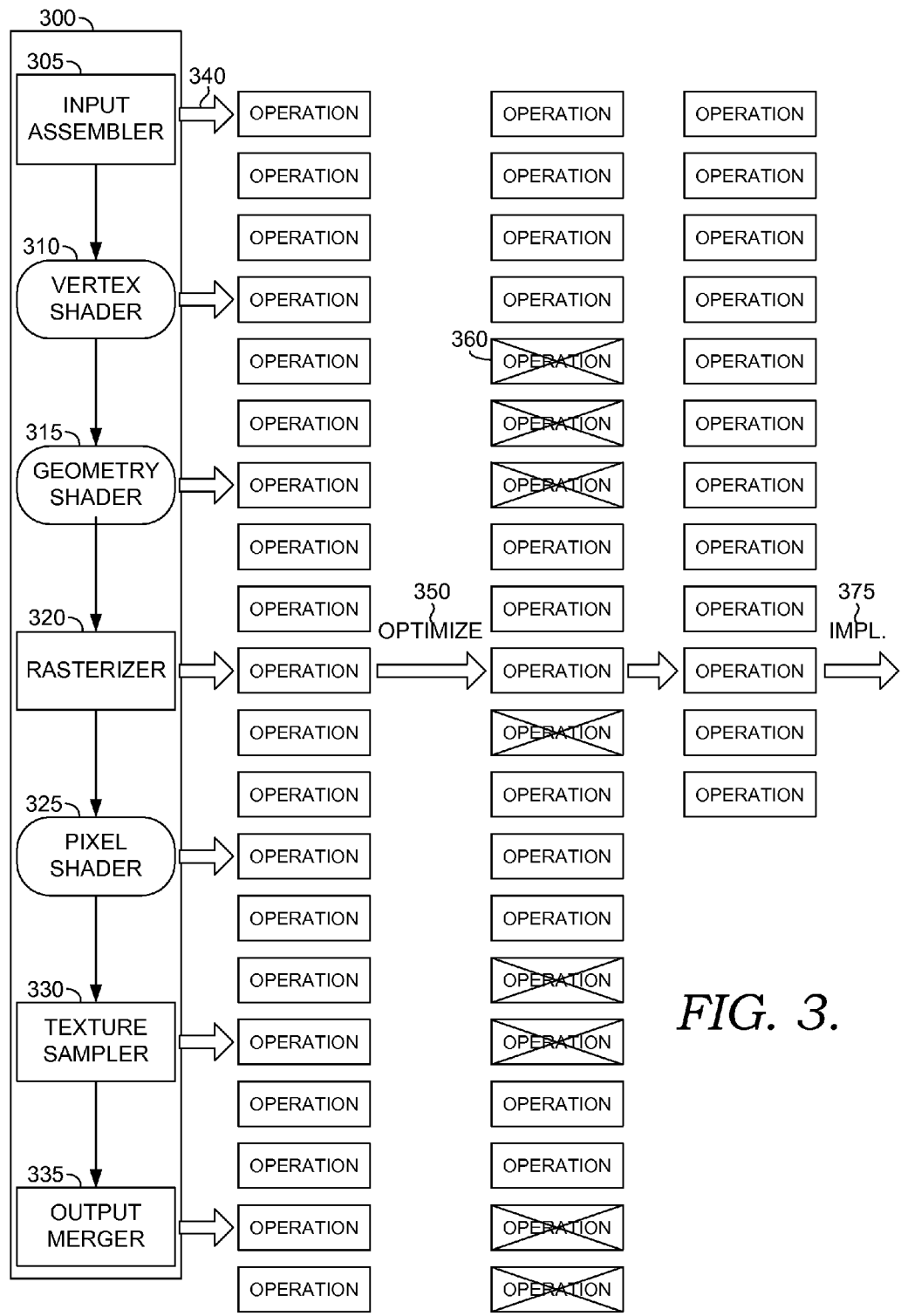
FIG. 3 is a flow diagram illustrating an exemplary diagram of optimizing software rasterization in accordance with an embodiment of the present invention.

With reference to FIG. 2 and FIG. 3, a diagram showing the translation 340 of data 300 comprising fixed function and programmable graphics state into a number of operations is shown. Receiving component 210 of FIG. 2 receives data 300 comprising fixed function and programmable graphics state. The data 300 is represented by an exemplary graphics pipeline in FIG. 3. The graphics pipeline includes the stages for transforming data into images to be displayed on a display device. The graphics pipeline includes an input assembler 305, vertex shader 310, geometry shader 315, rasterizer 320, pixel shader 325, texture sample 330, and out put merger 335. It will be appreciated that the graphics pipeline depicted in FIG. 3 is exemplary, and additional components may be added or components removed. The graphics pipeline 300 of FIG. 3 includes fixed function and programmable stages. Fixed function stages may include, but are not limited to, input assembler 305, rasterizer 320, texture sampler 330 and output merger 335. Programmable graphics states include vertex shader 310, geometry shader 315, and pixel shader 325.

Input assembler 305 reads vertices out of memory using fixed function operations and forms geometry and creates pipeline work items. Vertex shader 310 is a graphics processing function used to add special effects to objects in a 3D environment by performing mathematical operations on the objects' vertex data. Geometry shader 315 generates new graphics primitives, such as points, lines, and triangles, from those primitives that were sent to the beginning of the graphics pipeline. Rasterizer 320 performs clipping, perspective divide, viewport/scissor selection and implementation. Pixel shader 325 serves to manipulate a pixel color, usually to apply an effect on an image, for example; realism, bump mapping, shadows, and explosion effects. It is a graphics function that calculates effects on a per-pixel basis. The texture sampler 330 is utilized by the vertex shader 310, geometry shader 315 and pixel shader 325 to fetch data from memory. The texture sampler 330 can perform texture filtering operations, texture addressing modes such as clamp or wrap, convert between different format on reads and select multum in parvo (MIP) levels based on level of detail (LOD) values. Output merger 335 is fixed function and performs blend, depth and stencil operations.

The data 300 is translated into operations or representations by translation component 230 of FIG. 2. Once translated, the operations or representations are optimized 350 by optimization component 240 of FIG. 2. Exemplary optimizations are discussed in more detail below. As can be seen in FIG. 3, when the optimizations are applied, some of the operations are no longer necessary, such as operation 360. Once the optimizations have been applied, the remaining operations are implemented 375 by execution component 250 of FIG. 2.

Figure 4:
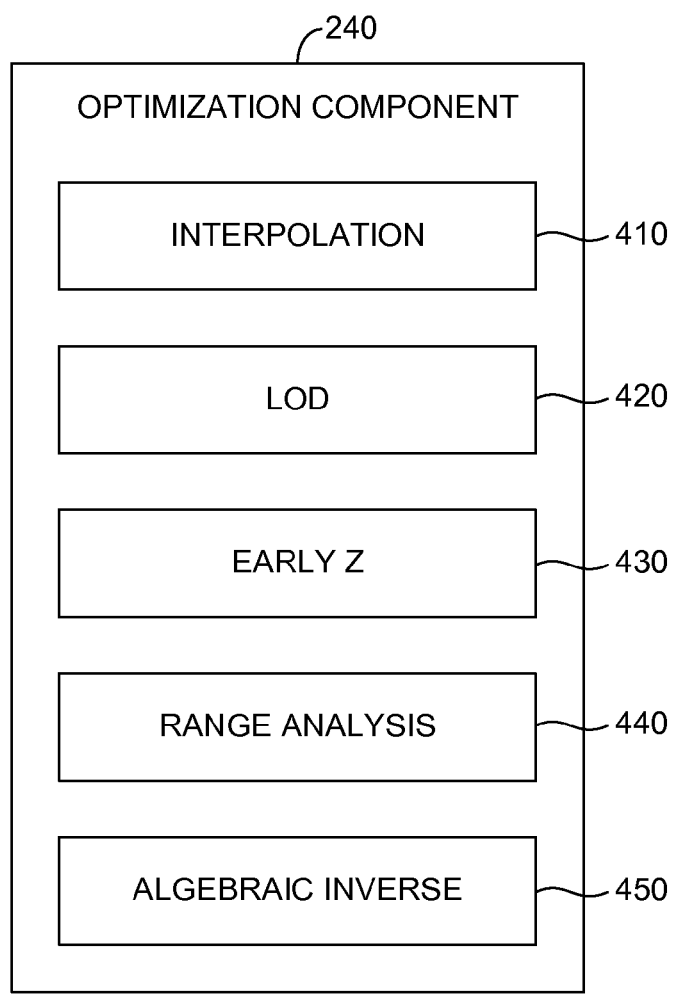
FIG. 4 is a block diagram illustrating an exemplary optimization component in accordance with an embodiment of the present invention.

With reference to FIG. 4, optimization component 240 includes an interpolation subcomponent 410, LOD subcomponent 420, early Z subcomponent 430, range analysis subcomponent 440 and algebraic inverse subcomponent 450. Interpolation subcomponent 410 is directed to an optimization to disable perspective correct attribute interpolation. A vertex is made up of 4 components (X, Y, Z, and W). The X, Y, and Z components denote the elements location in space while the W component is used to show the correct perspective. Two versions of the program of the program are typically generated. One version does not contain the perspective correct attribute interpolation. At draw time the rasterizer can then detect when all the W values are the same and the perspective correct version is not necessary. The version of the program without perspective correct attribute interpolation eliminates several operations needed to address the correct mip-map level. If all of the W-values of all the components are the same, perspective correct calculations are not necessary. Perspective divide is an expensive operation that transforms attributes such as texture coordinates to match the perspective of the geometry by dividing the interpolated texture coordinate by the W component per pixel.

The interpolation subcomponent 410 optimization disables the perspective-correct attribute interpolation when a primitive is rendered without perspective. For example, a 3-dimensional flat object is easier to compute than if the object is at an angle. The interpolation subcomponent 410 optimization detects if the 3-dimensional object is flat, so division is not necessary. This enables faster attribute interpolation and eliminates the need to calculate screen space derivatives to compute mip-map level of detail (LOD) during texturing and eliminates to the need to perform division on flat 3-dimensional objects.

LOD subcomponent 420 optimizes to detect constant levels of detail (LOD's) for faster code. Whether a variable is constant or not is tracked for each variable in the IR at each step of the program. When a variable that is constant is used to determine the LOD, the optimizer can hard code the logic to index the correct level of the mip-map. In graphics, an image may be stored in many levels of detail and at run time the level of detail that is needed is chosen. For example, far away objects may require lower levels of detail, while close up objects require higher levels of detail. The LOD subcomponent 420 determines if the distance is constant and if so, the LOD is constant for all pixels and only need be computed once for all pixels. This optimization enables faster texture sampling such that multiple LODs are not computed for images with a constant distance.

Early Z subcomponent 430 is an instruction-scheduling optimization that ensures that the depth test is performed as early as possible relative to other instructions in a program. The early Z subcomponent can rearrange the IR instructions to put the Z calculation as early as possible without violating dependencies. If needed, the instructions that calculate the Z value can also be moved higher up in the pipeline. The Z value can then be checked against the depth buffer and the program can terminate early if the depth test is failed. For example, when drawing an object, if it is located completely behind another object, a lot of computation for the object can be skipped. The early Z subcomponent 430 looks to each operation, determines if it relates to a hidden object, and if so, moves that operation earlier in the program. This enables an occlusion culling optimization which skips unnecessary processing for occluded pixels.

Range analysis subcomponent 440 is a range analysis optimization that computes the possible set of values that each variable can hold at each step of program execution. Mapping the fixed-function stages of the pipeline to IR may involve reading from a format that can only express a certain range, performing operations on the values, and writing those values back to format with the same range. Because the optimization component operates on a program that spans the fixed function and programmable portions of the pipeline, the optimization component can detect when values have not changed and do not require expensive range clamping. An example of this optimization is encountered when a texture with a range of 0 to 1 is read from and then written to a render target with a range of 0 to 1. In this example the expensive range checking operations can be removed and enables faster execution.

Algebraic inverse subcomponent 450 is an optimization that removes unnecessary data-type conversion instructions. The algebraic inverse subcomponent 450 detects mathematical operations that are equivalents and substitutes expensive operations with less expensive ones. This is possible across the entire program. Exemplary algebraic inverse optimizations are shown in Table 1 below.

TABLE 1

| | Original Operation | Optimized Operation |
|---|---|---|
| 1 | x = a * F<br>y = x * (1/F) | y = a |
| 2 | x = UNORMToFloat (a)<br>y = FloatToUNORM | y = a |
| 3 | x = a >> n<br>y = x & m<br>z = y << n | z = a & (m << n) |
| 4 | x = a & m1<br>y = a & m2<br>z = x | y | z = a & (m1 | m2) |
| 5 | x = Evaluate(N)<br>y = LoadTexDimension_CONSTLOD(L)<br>z = x * y | z = EvaluateScaled(N, L) |
| 6 | x = a >> N<br>y = x << N | y = a & ~((1 << N)−1) |
| 7 | x = Evaluate(N)<br>y = Dx(x) | y = AttribDx(N) |
| 8 | x = a + 0.0f | x = a |
| 9 | x = Evaluate(N)<br>y = FloatToUNORM(L) | y = EvaluateUNORMScaled(L) |
| 10 | A = B ? C : C | A = C |

The definition of the terms listed in Table 1 are as follows. The "Evaluate" operation interpolates the value of an attribute at a current pixel. The "EvaluateScaled" operation interpolates the value of an attribute multiplied by the width or height of a texture. This is used when the LOD for sampling is constant for all pixels. Because the LOD is constant, the width and height are constant, and the multiplication can occur once per-primitive (triangle or line), rather than once per-pixel.

The "EvaluateUNORMScaled" operation interpolates the value of an attribute multiplied by the range of values supported by a render target (an 8 bit render target can store 256 unique values). Because the output range is constant, the multiplication can occur once per-primitive (triangle or line), rather than once per-pixel. The "Dx" computes the derivative of an attribute by differencing adjacent attribute values. The "AttribDx" computes the derivative of an attribute with respect to the screen space "x" coordinate. This derivative is constant across a primitive, and hence only needs to be computed once per-primitive, rather than once per-pixel. The "UNORMToFloat" takes an integer in the range [0, N] and returns a floating point number in the range [0.0, 1.0]. The "FloatToUNORM" takes a floating point number in the range [0.0, 1.0] and returns an integer in the range [0, N].

Optimizations of the optimization component may be interrelated or even dependent on one another. For example, many of the algebraic inversion optimizations performed by the algebraic inverse subcomponent 450 depend on the optimizations performed by the interpolation subcomponent 410. For example, algebraic operations 5, 6 and 9 from Table 1 are effective after the interpolation subcomponent 410 performs the optimization to disable perspective correct attribute interpolation. In another example, the performance of the optimization to detect constant LOD's for faster code by the LOD subcomponent 420 is dependent on the performance by the algebraic inverse subcomponent 450 of the algebraic inverse operation 7 from Table 1.

Referring again to FIG. 2, the execution component 250 of the software rasterization module 210 is responsible for executing the data-parallel programs once the optimizations have been performed. Because the data-parallel programs are utilized, several vertices, primitives or pixels can be executed in parallel. It will be appreciated that there may be a variety of ways to execute the data-parallel programs. In one embodiment, the data parallel programs are interpreted in a virtual machine. The interpreter amortizes the cost of emulation across a batch of pixels by executing many pixels in parallel. Thus, instead of interpreting the program once per-pixel, it is performed for a block of pixels.

In a second embodiment, a compiler is used to execute the data-parallel programs. An exemplary compiler is a just-in-time (JIT) compiler capable of emitting single instruction multiple data (SIMD) CPU instructions. The optimized high-level IR is mapped to processor specific code utilizing a JIT compiler.

Figure 5:
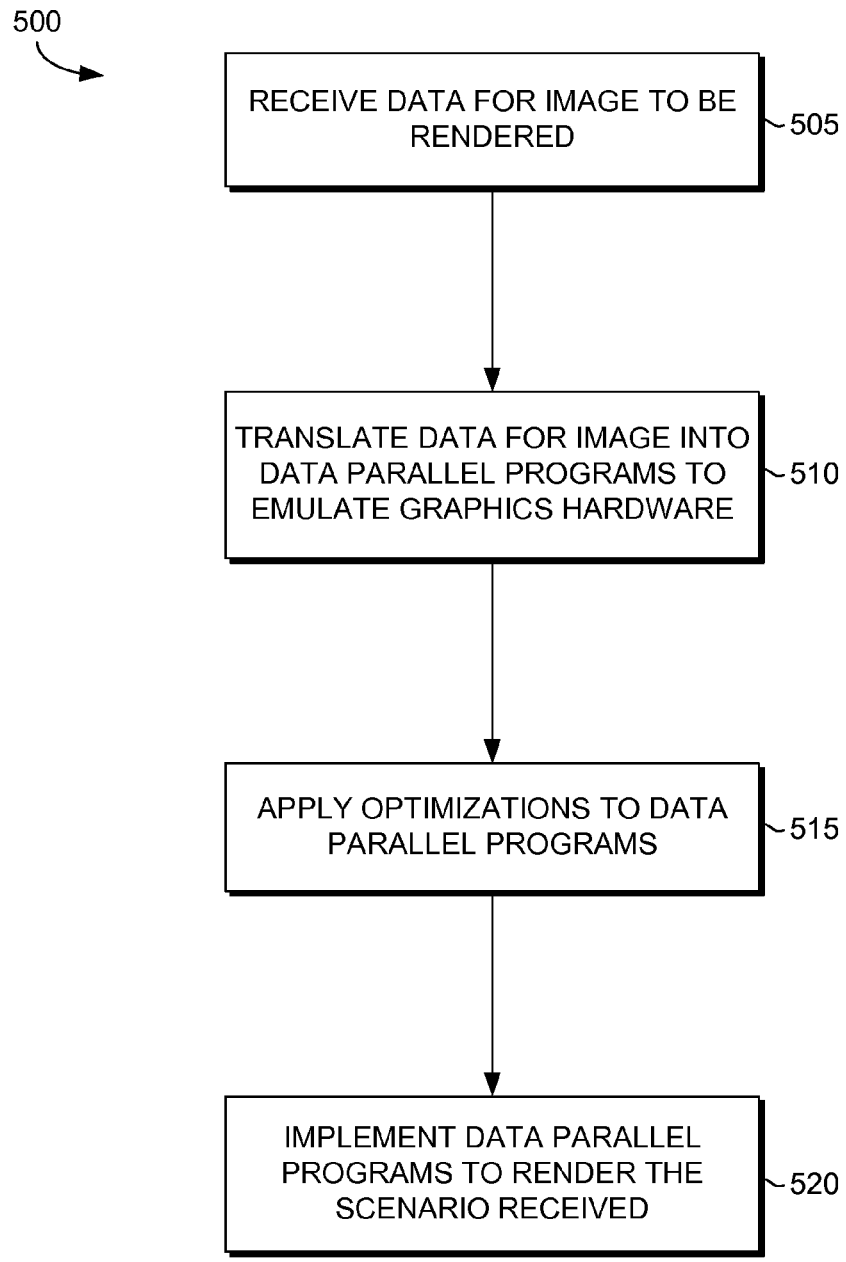
FIG. 5 is a flow diagram of a method applying optimization to software rasterization in accordance with an embodiment of the present invention.

With reference to FIG. 5, a computer-implemented method 500 for implementing optimized data parallel programs emulating fixed function and programmable graphics hardware is provided. At step 505 a three-dimensional rendering scenario is received for a client application. For example, a computing user may select a video to display. At step 510, the fixed function and programmable state of the rendering scenario is translated in data parallel programs to emulate graphics hardware. At step 515, optimizations are applied to the data parallel programs. As discussed above, a variety of optimizations may be applied to the translated fixed function and programmable state operations. At step 520, the data parallel programs are implemented. As also discussed above, the data parallel programs may be implemented utilizing a compiler, such as a just-in-time compiler, or utilizing an interpreter. The optimized rendering scenario is displayed to the client on a display device.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A computer-implemented method for optimizing emulated fixed-function and programmable graphics, the method comprising:
   receiving data comprising fixed function and programmable states for one or more images to be rendered;
   translating the data for the one or more images into one or more representations;
   translating the fixed-function and programmable state of a graphics pipeline into:
   (1) a vertex program, and
   (2) a pixel program
      implementing, in parallel, vertex processing, geometry processing, and pixel processing of the graphics pipeline;
   applying one or more optimizations to the representations, wherein the one or more optimizations includes identifying a constant variable associated with a plurality of pixels and performing computations for one of the plurality of pixels such that the computation is applied to each of the plurality of pixels;
   mapping the optimized representations to a processor-specific code; and
   implementing the optimized representations to render the one or more images.

2. The method of claim 1, further comprising:
   displaying the rendered image.

3. The method of claim 2, wherein the data is translated into data parallel programs.

4. The method of claim 2, wherein a just-in-time complier implements the data parallel programs to render the one or more images.

5. The method of claim 2, wherein an interpreter interprets one or more data parallel programs for a block of pixels to render the one or more images.

6. The method of claim 1, wherein the translation of the one or more images into representations comprises software rasterization.

7. The method of claim 6, wherein the translation is performed by a central processing unit.

8. The method of claim 6, wherein the translation is performed by a computing device.

9. The method of claim 1, wherein the one or more optimizations comprises disabling perspective correct attribute interpolation when a primitive is rendered without perspective.

10. The method of claim 9, wherein the one or more optimizations comprises removing unnecessary data-type conversion instructions.

11. The method of claim 10, wherein the one or more optimizations comprises determining that the level of detail is constant for all pixels if distance is constant.

12. The method of claim 1, wherein the one or more optimizations comprises rearranging the operations to make the Z calculation occur early in a program.

13. The method of claim 1, wherein the one or more optimizations comprises removing unneeded range check operations.

14. A computerized system for optimizing emulated fixed-function and programmable graphics, the system comprising:
   a receiving component configured for receiving data comprising fixed function and programmable states for one or more images to be rendered;
   a translation component configured for translating the data into one or more representations and translating the fixed-function and programmable state of a graphics pipeline into:
   (1) a vertex program, and
   (2) a pixel program
      implementing vertex processing, geometry processing, and pixel processing of a the graphics pipeline;
   an optimization component configured for applying one or more optimizations to the one or more representations, wherein the one or more optimizations includes identifying a constant variable and performing one computation one time for all pixels associated with the constant variable; and
   an execution component configured for executing the one or more optimized representations to render the one or more images.

15. The system of claim 14, further comprising:
   a displaying component for displaying the rendered image on a display device.

16. The system of claim 14, wherein the translation is performed by a central processing unit.

17. The system of claim 14, wherein the translation is performed by a computing device.

18. The system of claim 14, wherein a just-in-time complier implements the optimized representations to render the one or more images.

19. The system of claim 14, wherein an interpreter interprets one or more optimized representations for a block of pixels to render the one or more images.

20. One or more computer-storage media having computer-executable instructions embodied thereon that, when executed perform a method for optimizing emulated fixed-function and programmable graphics, the method comprising:
   receiving data comprising fixed function and programmable states for one or more images to be rendered;
   translating the data for the one or more images to be rendered into data parallel programs represented by high-level commands, the parallel programs comprising:
   (1) a vertex program, and
   (2) a pixel program
      implementing vertex processing, geometry processing, and pixel processing of a the graphics pipeline;
   applying one or more optimizations to the high-level commands, wherein the one or more optimizations includes identifying a constant variable associated with a plurality of pixels and performing computations for one of the plurality of pixels such that the computation is applied to each of the plurality of pixels;
   mapping the high-level commands to a processor-specific code;
   determining that a mip map level of detail variable for the one or more images is constant;
   indexing a mip map level for the one or more images;
   implementing the optimized high-level commands to render the one or more images; and
   displaying the one or more rendered images.

* * * * *